Jan. 17, 1933.  W. W. SLOANE  1,894,923
DRIVE MECHANISM FOR SHAKER CONVEYERS
Filed Jan. 6, 1930  6 Sheets-Sheet 1
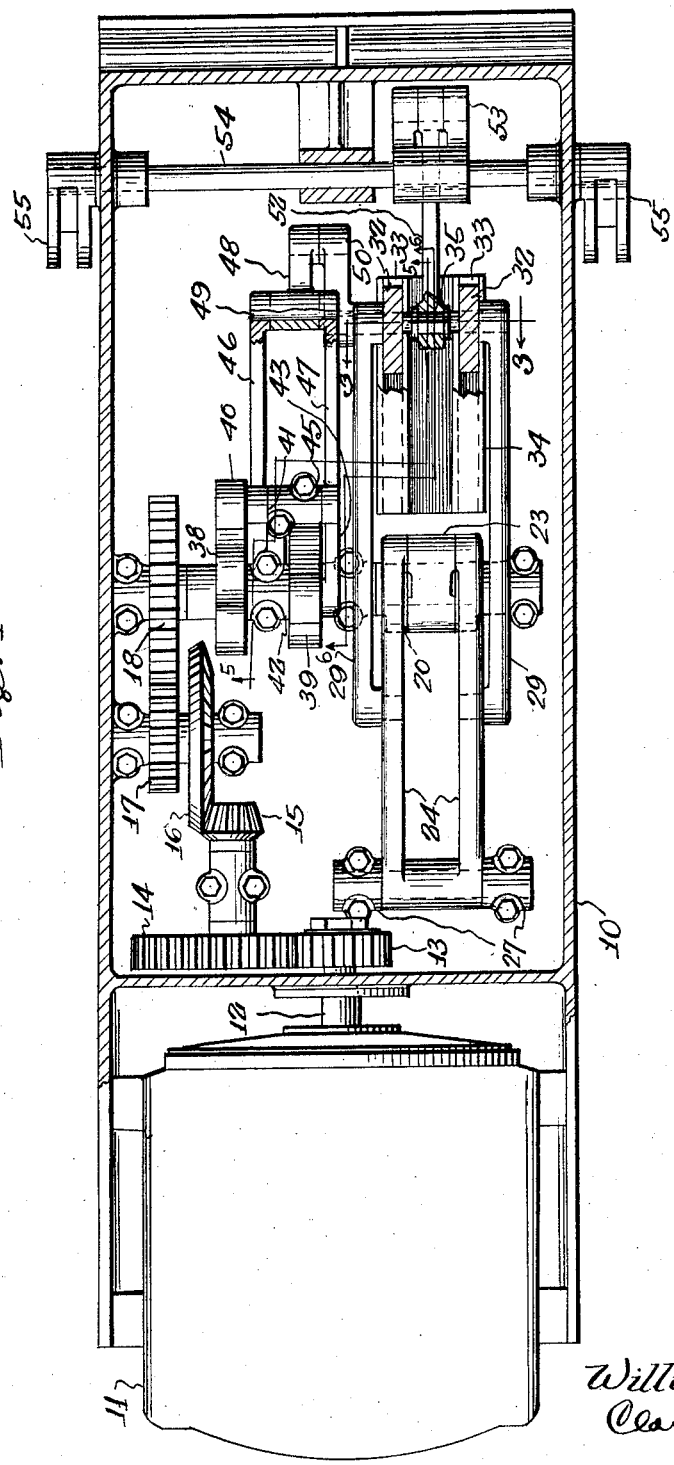

Jan. 17, 1933.   W. W. SLOANE   1,894,923
DRIVE MECHANISM FOR SHAKER CONVEYERS
Filed Jan. 6, 1930   6 Sheets-Sheet 2
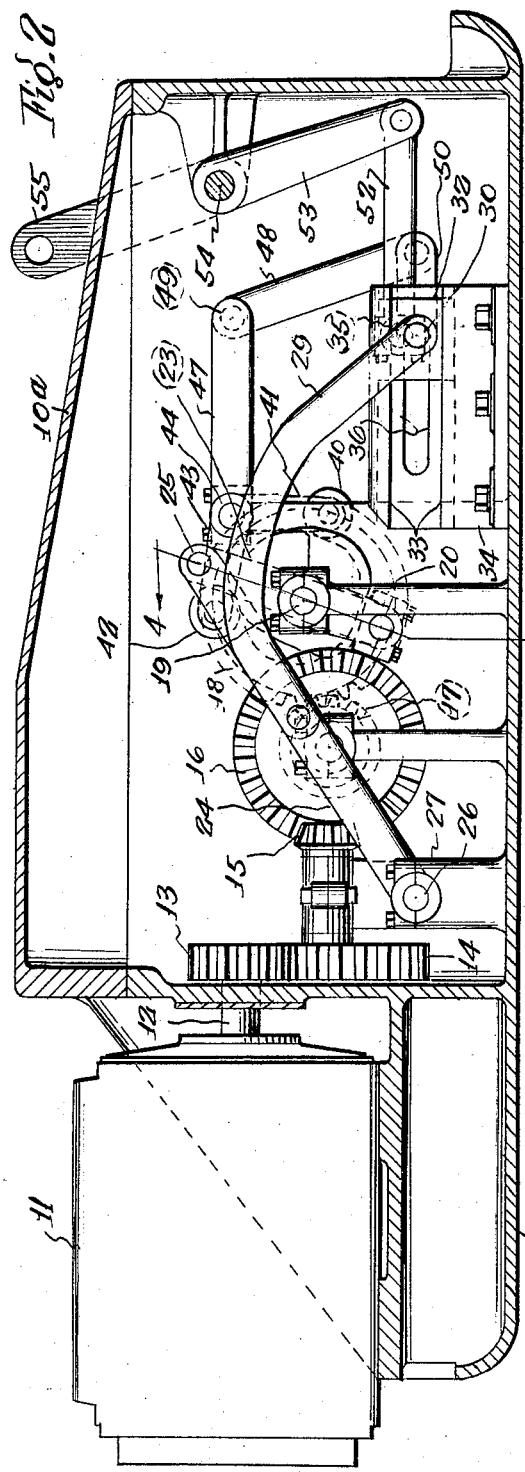
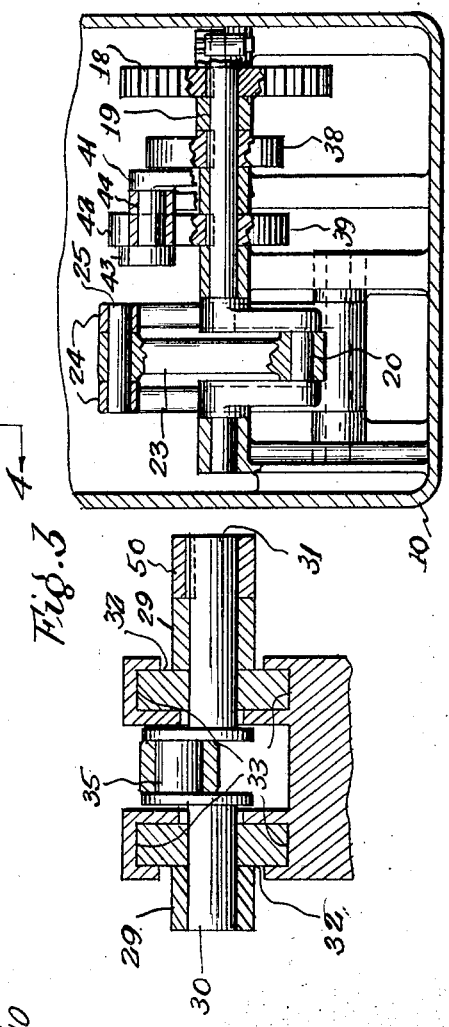
Inventor
William W. Sloane
Clarence F. Poole
Attorney

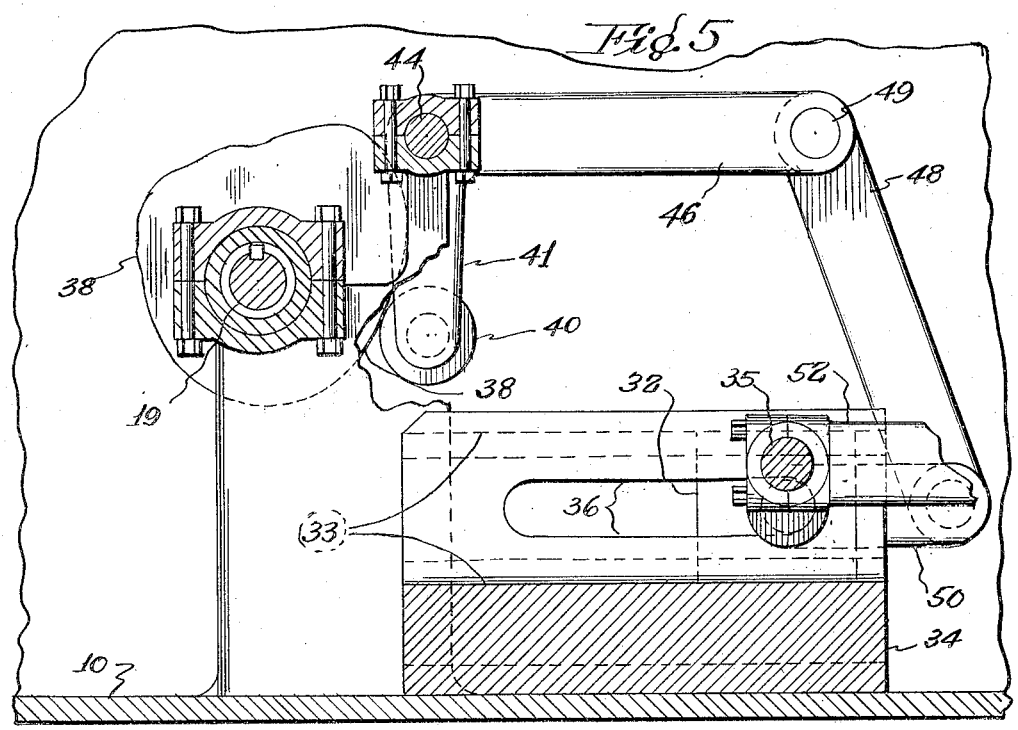
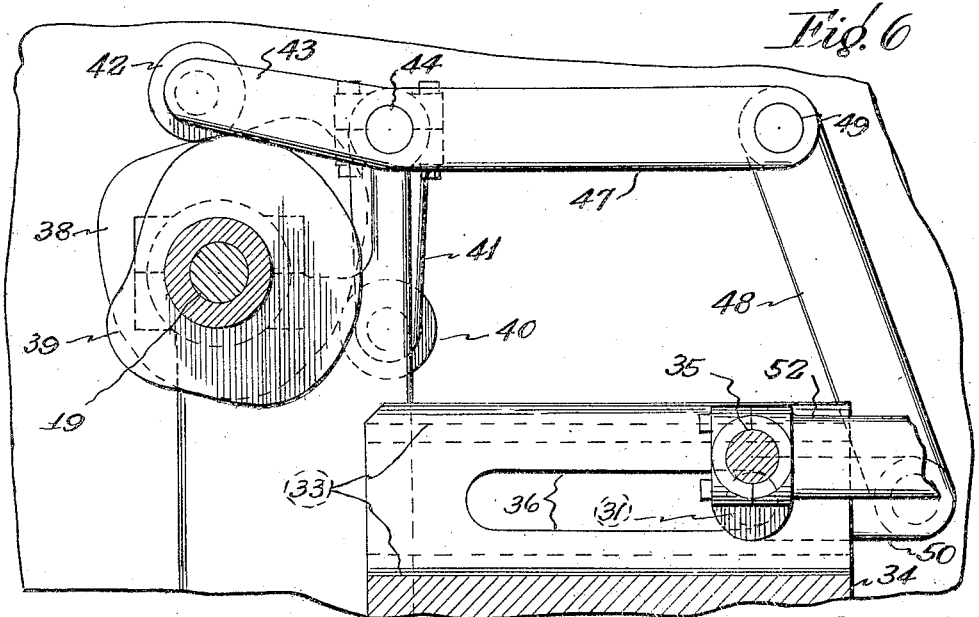

Jan. 17, 1933.   W. W. SLOANE   1,894,923
DRIVE MECHANISM FOR SHAKER CONVEYERS
Filed Jan. 6, 1930   6 Sheets-Sheet 4
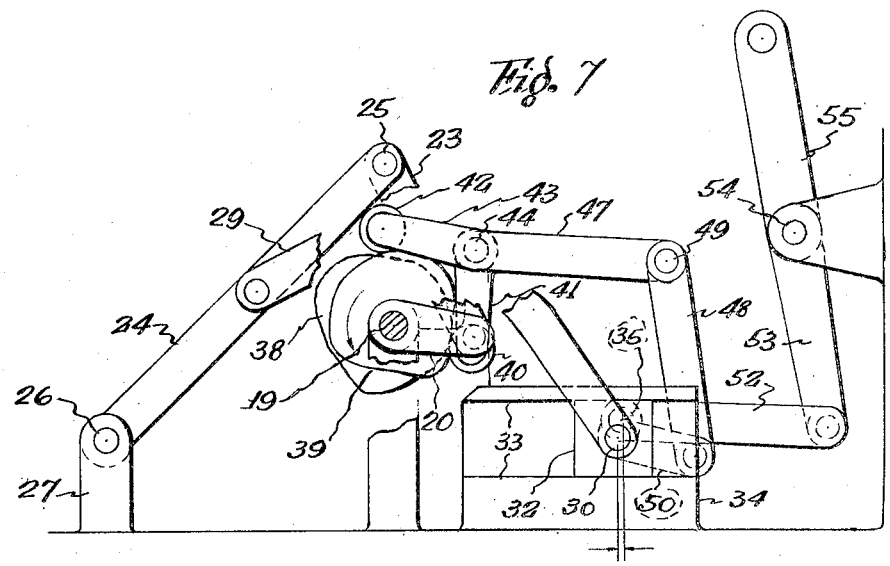
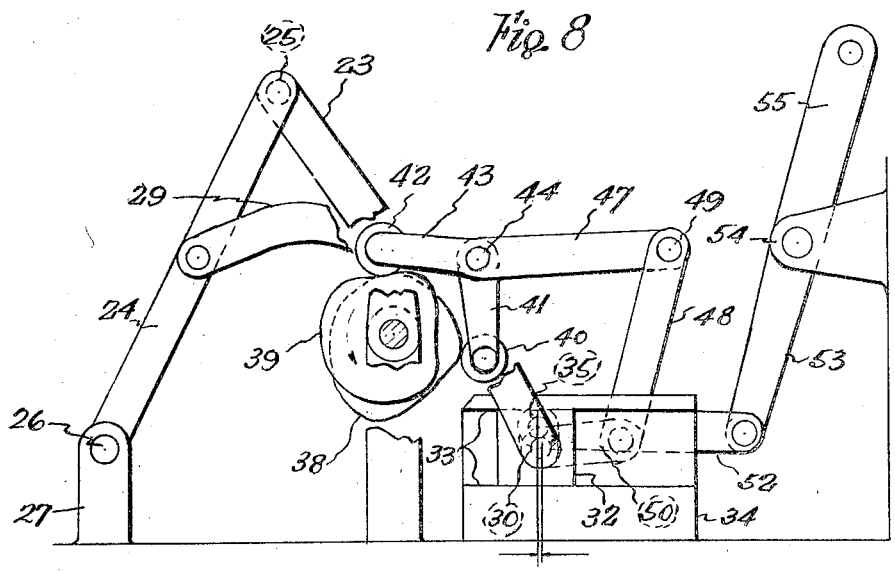
Inventor
William W. Sloane
Clarence F. Poole
Attorney Jan. 17, 1933.                W. W. SLOANE                    1,894,923
                 DRIVE MECHANISM FOR SHAKER CONVEYERS
                    Filed Jan. 6, 1930        6 Sheets-Sheet 5
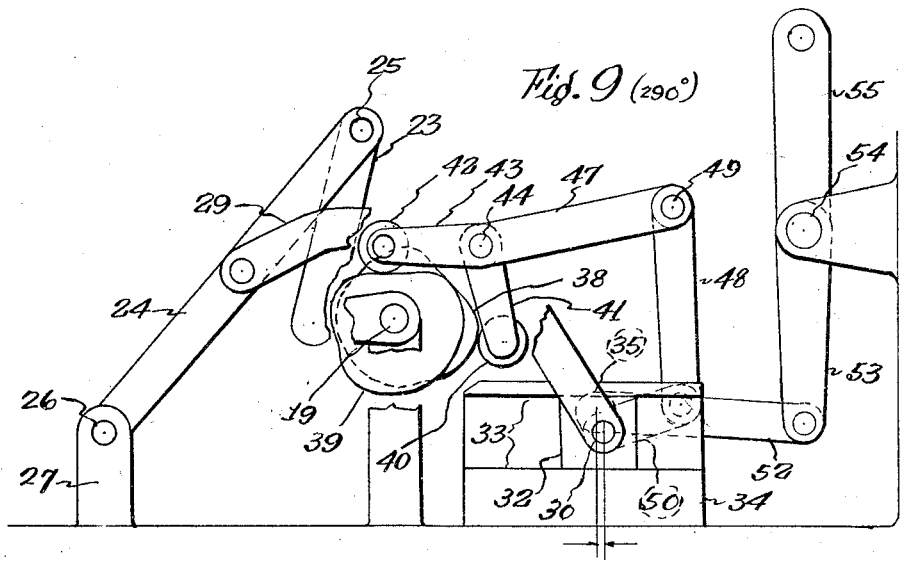
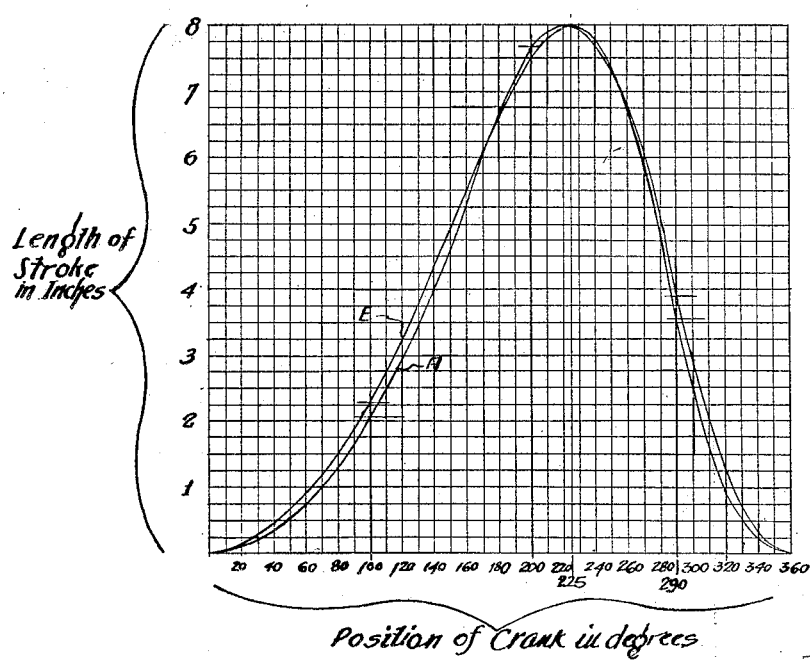

Patented Jan. 17, 1933

1,894,923

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

DRIVE MECHANISM FOR SHAKER CONVEYERS

Application filed January 6, 1930. Serial No. 418,680.

This invention relates to improvements in drive mechanisms for shaker or jigging conveyers, and has among other objects to provide a new and improved means for driving a jigging conveyer with a view particularly toward providing a more efficient shaker conveyer drive than has formerly been provided.

Other objects of my invention will appear from time to time as this specification proceeds.

My invention may be more clearly understood with reference to the accompanying drawings wherein:

Figure 1 is a top plan view of the device of my invention with parts broken away and in section;

Figure 2 is a side elevation of the device shown in Figure 1 with parts in section;

Figure 3 is a partial sectional view taken on line 3—3 of Figure 1.

Figure 4 is a sectional view taken on line 4—4 of Figure 2 with other parts broken away and in section;

Figure 5 is an enlarged partial sectional view taken on line 5—5 of Figure 1;

Figure 6 is an enlarged partial sectional view taken on line 6—6 of Figure 1;

Figures 7, 8 and 9 are diagrammatic views of the device of my invention with parts broken away and with the crank and parts shown in different positions in different views;

Figure 10 is a graph comparing the action of a jigging device of an ordinary construction with the action of a theoretically correct jigging device.

Like numerals refer to like parts throughout the various figures.

Figure 11:
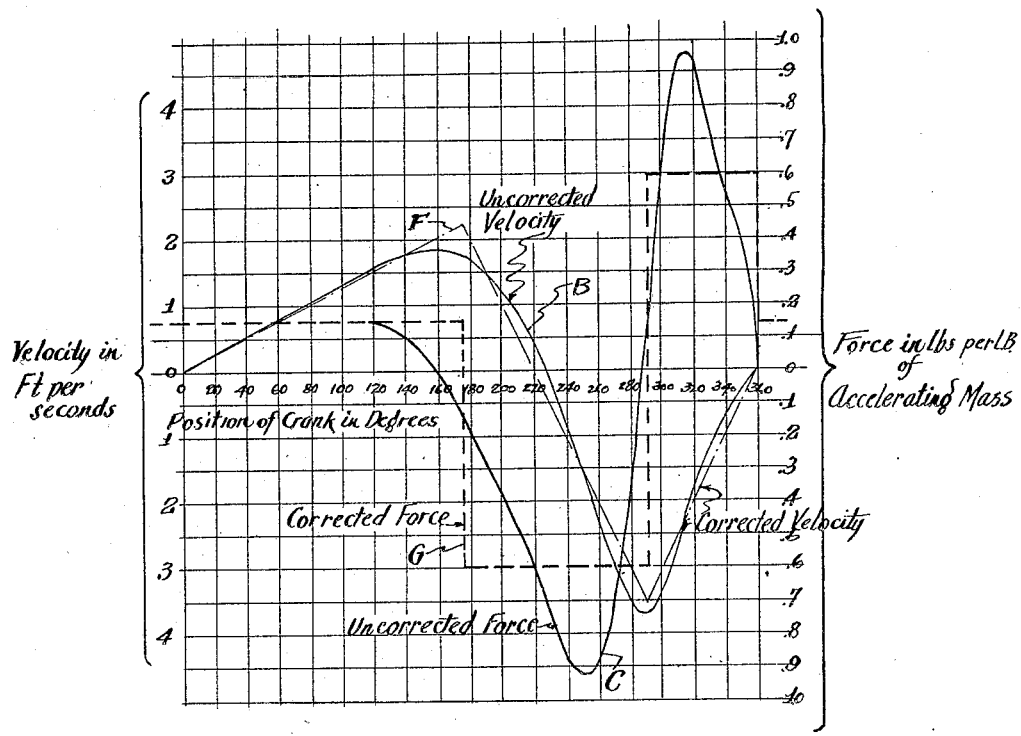
Figure 11 is a graph showing the velocity and force curves of a jigging device of an ordinary construction and a theoretically correct jigging device.

Referring now in particular to the drawings, a main frame 10 is provided to support the drive mechanism. This main frame 10 is adapted to rest on the floor of a mine and be moved therealong on its bottom when it is desired to transport the drive mechanism about a mine, and is provided with a cover 10a which totally encloses all moving parts.

A motor 11 is provided on one end of said main frame and forms a prime mover for the shaker conveyer drive mechanism. This motor may be of any type, but is herein shown as an electric motor of an ordinary construction, and is provided with a motor shaft 12 having a motor pinion 13 thereon.

The motor pinion 13 drives a spur gear 14, which gear causes rotation of a bevel pinion 15. The bevel pinion 15 meshes with and drives a bevel gear 16 which causes rotation of a spur gear 17, which spur pinion drives a spur gear 18 keyed on one end of a shaft 19. A crank 20 is integral with the opposite end of said shaft.

A connecting rod 23 is journaled on the crank 20 at one end and has its opposite end connected to ends of a pair of parallel spaced arms 24, 24, on each side of said connecting rod, by means of a pin 25. The arms 24, 24 are joined together at their other ends and are pivotally mounted on the main frame 10 by a shaft 26 journaled at its ends in supports 27 integral with said main frame. An arm 29 is pivoted to the outer side of each of the arms 24 intermediate the ends of the arms 24. The arms 29 are spaced in parallel relation with respect to each other and extend forwardly from the arms 24 and are bowed to provide clearance between said arms and the shaft 19 and supports therefor. The forward end of one arm 29 is mounted on a shaft 30 while the forward end of the opposite arm 29 is mounted on a shaft 31. The shafts 30 and 31 are each mounted in a separate block 32. Each block 32 is slidably mounted in guides 33 so as to be reciprocably movable longitudinally of the main frame 10 on movement of the arms 29, 29. The guides 33 are integral with a member 34 fixed on the main frame 10 and are spaced apart to provide a guide for a crank 35 fixed to the inner ends of the shafts 30 and 31, which shafts ride in slots 36, 36 through the guides 33.

It may now be seen that rotation of the crank 20 effects reciprocal movement of the blocks 32 in the guides 33 through the connecting rod 23, arms 24 and arms 29. These arms are so arranged with respect to each other as to cause the blocks 32 to move forwardly in the guides 33 at a rate of speed which is rapidly accelerated for a short portion of the length of its forward stroke and then gradually decelerated for the remainder of its forward stroke and thence gradually accelerated for a greater portion of its rearward stroke and rapidly decelerated for the remainder of its rearward stroke moving a conveyer trough (not shown) connected thereto through a suitable system of levers, which will hereinafter be more clearly described, in an opposite direction. Thus the gradual acceleration of the conveyer trough for the greater portion of its forward stroke with its rapid deceleration for the remainder of its forward stroke, which is the rearward stroke of the blocks 32, together with its rapid acceleration for a short portion of its return stroke and gradual deceleration for the greater portion of its return stroke will move material therealong in a manner well known to the art. Line A in Figure 10 represents the movement of the blocks 32 in the guides 33. Line B in Figure 11 represents the velocity of the blocks 32 in the guides 33 while line C in Figure 11 represents the force used to move the blocks 32 in the guides 33.

In order that the efficiency of the conveyer may be increased it is desirable to correct the curve represented by line A so it approaches a curve represented by line E, which curve is a theoretically correct curve of the movement of a jigging conveyer so as to convey a given amount of material in a minimum amount of time with a minimum of energy. This theoretical curve gives a uniform velocity as is represented by line F in Figure 11 with a quick reversal of velocity. This curve also requires much less force to reciprocate the conveyer as is represented by line G in Figure 11.

Referring now in particular to the method of producing a mechanism for reciprocating a conveyer, the movement of which will approach the theoretically correct curve E which is the novel feature of my invention, a means is provided for superimposing one movement on another movement which modifies or corrects the first mentioned movement represented by line A in Figure 10 so said first mentioned movement approaches the movement represented by line E in Figure 10.

Cams 38 and 39 are keyed on the shaft 19. These cams are laid out from the theoretically correct curve E and are obtained from the difference in movement of the block 32 represented by the line A from the movement represented by the line E, and are shaped so each cam will produce the same movement but one cam is preferably laid out 100 degrees behind the other cam. A roller 40 on a lever 41 rides on the cam 38 while a roller 42 on a lever 43 rides on the cam 39. These levers are preferably spaced 100 degrees apart to correspond with the cams 38 and 39 and are fixed on the opposite ends of a shaft 44 so movement of one lever will effect movement of the opposite lever thus providing a means to positively hold each roller in engagement with its respective cam.

The shaft 44 is journaled in a support 45 integral with the main frame 10. A lever arm 46 is integral with the lever 41 and projects forwardly therefrom while another lever arm 47 is integral with the lever 43 and projects forwardly from said lever and is parallel with the lever arm 46. The forward ends of the lever arms 46 and 47 are pivotally connected to opposite sides of a connecting arm 48 by means of a pin 49. The connecting arm 48 is in turn connected with a crank arm 50 which is keyed on the outer end of the shaft 31 as is illustrated in detail in Figure 3.

It may thus be seen that rotation of the cams 38 and 39 causes the lever arms 46 and 47 to move about the axis of the shaft 44 which causes the crank 35 to move about the axis of the shafts 30 and 31 by means of the connecting arm 48, crank arm 50 and shaft 31.

Thus as the crank 35 is reciprocably moved by means of the arms 29, it is also simultaneously pivotally moved by means of the cams 38 and 39. See Figures 7, 8 and 9, which figures show the relative movement of the crank 35 in different positions of the crank 20, which movement is simultaneous with the reciprocable movement of the shafts 30 and 31.

A connecting link 52 is pivotally connected at one end to the crank 50 and has its opposite end connected to a lever arm 53 fixed to a transverse shaft 54. Lever arms 55 are fixed on opposite ends of the transverse shaft 54 and form a means for connecting the conveyer to the drive mechanism and moving said conveyer in a direction opposite to the direction of movement of the blocks 32 and crank 35. These lever arms are shown as projecting above the drive mechanism, but it is obvious that they may be positioned to project downwardly from the shaft 54 for operating in low coal.

The arrangement is such that the oscillation of the crank 35, as above described, effects a modification or correction of the action of the crank 20 upon the lever arm 53 whereby to produce a theoretically correct movement, as indicated by the line E in Figure 10 and jigging lines F and G in Figure 11.

It may now be seen that I have provided a means for operating a jigging or shaker conveyer which is adapted to produce a reciprocating movement of the conveyer approximating a mathematically calculated theoretically correct movement. Furthermore, it may be seen that such a movement is effected by modifying or correcting the movement of one actuating device, such as a usual and desirable crank device, by another actuating device, preferably a cam device.

While I have herein shown and described one embodiment of my invention, it will be understood that the arrangement and construction of the various parts may be changed or altered without departing from the spirit and scope thereof. Furthermore, I do not wish to be construed as limiting myself to the specific form illustrated excepting as it may be limited in the appended claims.

I claim as my invention:

1. In a shaker conveyer operating mechanism, the combination with a reciprocable driven member of two rotating operating devices rotatable about fixed axes and operating in timed relation, and connecting mechanism between said driven member and said devices whereby said driven member is reciprocated and adapted to modify the action of one device upon said driven member by the other device comprising a crank slidable in a fixed guide, a connection from one of said rotating operating devices for reciprocating said crank in said guide, and a connection from said other rotating operating device for simultaneously oscillating said crank.

2. In a shaker conveyer operating mechanism, the combination with a reciprocable driven member of a rotating crank, a rotating cam device operating in timed relation with said crank, and connecting mechanism between said driven member and said crank and cam devices whereby said driven member is reciprocated and adapted to modify the action of said crank device upon said driven member by said cam device.

3. In a shaker conveyer operating mechanism, the combination with a reciprocable driven member of two operating devices operating in timed relation, a connection between said driven member and one of said devices for operating said driven member and including a member movable to modify the action of this device upon said driven member, and a connection between the other of said devices and said modifying member whereby this other of said devices modifies the action of the first mentioned of said devices upon said driven member.

4. In a shaker conveyer operating mechanism, the combination with a reciprocable driven member of a rotating crank, a rotating cam device operating in timed relation with said crank, a connection between said driven member and said crank for operating said driven member including a second crank angularly movable to modify the action of said first mentioned crank upon said driven member, and a connection between said cam device and said second crank for oscillating said second crank.

5. In a shaker conveyer operating mechanism, the combination with a reciprocable driven member of a rotating crank, a rotating crank cam device operating in timed relation with said crank, a reciprocable slidably mounted block, a connection between said crank and said block for reciprocating said block, a second crank carrier on said block for angular movement with respect thereto, a connection between said second crank and said driven member whereby said driven member is reciprocated with said block and whereby angular movement of said second crank effects the relative movement between said block and said driven member, and a connection between said cam device and said second crank for oscillating said second crank to modify the action of said first mentioned crank upon said driven member.

6. In combination with a shaker conveyer drive, a frame, a motor, crank mechanism driven by said motor, a reciprocably movable drive member reciprocated thereby comprising a crank reciprocably movable in a guide having driven mechanism connected thereto, and means for oscillating said last mentioned crank simultaneously with reciprocable movement thereof comprising a rotatable cam driven by said motor and connecting mechanism between said cam and crank.

7. In combination with a shaker conveyer drive, a frame, a motor, crank mechanism driven by said motor, a reciprocably movable drive member reciprocated thereby, and means for angularly moving said reciprocably movable drive member simultaneously with reciprocable movement of said reciprocably movable drive member comprising a cam driven by said motor, a roller on said cam, and a link and lever mechanism interposed between said roller and said reciprocably movable drive member, and having operative connection therewith.

8. In combination with a shaker conveyer drive, a frame, a motor, a crank driven by said motor, a block, mechanism interposed between said crank and said block for reciprocably moving said block, a crank connected to said block and reciprocated thereby, and means for moving said second mentioned crank about its pivotal axis simultaneously with reciprocable movement of said second mentioned crank comprising a cam driven from said motor.

9. In combination with a shaker conveyer drive, a frame, a motor, a crank driven by said motor, a block, mechanism interposed between said crank and said block for reciprocably moving said block, a crank connected to said block and reciprocated thereby, and means for moving said second mentioned crank about its pivotal axis simultaneously with reciprocable movement of said second mentioned crank comprising a cam driven from said motor, a roller on said cam, link and lever mechanism connectible with said roller and said second mentioned crank for actuating said second mentioned crank, and conveyor drive mechanism connectible with said second mentioned crank.

10. In combination with a shaker conveyer drive, crank mechanism, a reciprocably movable member reciprocated thereby, a conveyer drive mechanism connectible therewith comprising an offset member pivotally mounted on said reciprocably movable member and reciprocated thereby, a conveyer drive member connectible with the offset portion of said offset member and means for simultaneously reciprocably moving said offset member about its axis on said reciprocably movable member simultaneously with and in coordination with said reciprocably movable member comprising a cam and lever mechanism connected with said offset member.

11. In combination with a shaker conveyer drive, crank mechanism, a reciprocably movable member reciprocated thereby, a conveyer drive mechanism connectible therewith including means for modifying the movement of the reciprocably movable member driven from said crank comprising an offset member connected with said reciprocably movable member and a cam having operative connection with said offset member, a second cam coaxial with said first mentioned cam also having operative connection with said offset member, a roller forwardly of said first mentioned cam, a roller engageable with said second mentioned cam, and means for connecting said rollers together so said roller on one of said cams will hold said roller on said opposite cam in engagement therewith and vice-versa.

Signed at Chicago, in the county of Cook and State of Illinois this 3rd day of January, 1930.

WILLIAM W. SLOANE.